US 12,117,175 B2

(12) United States Patent
Miura et al.

(10) Patent No.: US 12,117,175 B2
(45) Date of Patent: Oct. 15, 2024

(54) COMBUSTOR AND GAS TURBINE

(71) Applicant: MITSUBISHI HEAVY INDUSTRIES, LTD., Tokyo (JP)

(72) Inventors: Keisuke Miura, Tokyo (JP); Shinichi Fukuba, Tokyo (JP); Keijiro Saito, Tokyo (JP); Kenji Miyamoto, Tokyo (JP); Kenta Taniguchi, Tokyo (JP); Kiyoshi Fujimoto, Tokyo (JP); Tomo Kawakami, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/371,091

(22) Filed: Sep. 21, 2023

(65) Prior Publication Data
US 2024/0011635 A1    Jan. 11, 2024

Related U.S. Application Data

(63) Continuation of application No. PCT/JP2022/012462, filed on Mar. 17, 2022.

(30) Foreign Application Priority Data

Mar. 31, 2021 (JP) .................................. 2021-062224

(51) Int. Cl.
*F23R 3/28* (2006.01)
*F02C 3/06* (2006.01)
(52) U.S. Cl.
CPC .................. *F23R 3/28* (2013.01); *F02C 3/06* (2013.01); *F05D 2240/35* (2013.01)
(58) Field of Classification Search
CPC .... F23R 3/28; F23R 3/286; F02C 3/06; F05D 2240/35
See application file for complete search history.

(56) References Cited

U.S. PATENT DOCUMENTS 4,100,733 A * 7/1978 Striebel ................... F23R 3/286
239/431
2009/0293484 A1    12/2009 Inoue et al.
(Continued)

FOREIGN PATENT DOCUMENTS

FR    2933766 A1 *  1/2010  .............. F23R 3/286
JP    2008-111651    5/2008
(Continued)

OTHER PUBLICATIONS

International Search Report issued May 24, 2022 in International Application No. PCT/JP2022/012462, with English translation.
(Continued)

*Primary Examiner* — Steven M Sutherland
(74) *Attorney, Agent, or Firm* — Wenderoth, Lind & Ponack, L.L.P.

(57) ABSTRACT

A combustor includes: a tube plate having an upstream side end face and a downstream side end face that are orthogonal to a combustor axis, in which an air hole passing through the upstream side end face and the downstream side end face is formed in the tube plate; and a fuel injector that injects fuel into air passing through the air hole. The air hole has: a bent channel that curves toward a direction orthogonal to the combustor axis toward the downstream side; and an inclined channel that is connected to the downstream side of the bent channel so as to be continuous therewith, and that extends inclining with respect to the combustor axis and opens to the downstream side end face. A fuel injection position at which the fuel injector injects fuel is located on the downstream side of the upstream end of the bent channel.

11 Claims, 6 Drawing Sheets

(56) References Cited

U.S. PATENT DOCUMENTS

2016/0040884 A1    2/2016  Citeno et al.
2016/0290651 A1*  10/2016  Donovan .............. F23D 11/383
2017/0248318 A1*   8/2017  Kulkarni ................. F23R 3/46

FOREIGN PATENT DOCUMENTS

JP    2013-178047    9/2013
JP    2016-38197     3/2016

OTHER PUBLICATIONS

Written Opinion of the International Searching Authority issued May 24, 2022 in International Application No. PCT/JP2022/012462, with English translation.

* cited by examiner

COMBUSTOR AND GAS TURBINE

TECHNICAL FIELD

The present disclosure relates to a combustor and a gas turbine.

This application claims the priority of Japanese Patent Application No. 2021-062224 filed in Japan on Mar. 31, 2021, the content of which is incorporated herein by reference. This application is a continuation application based on a PCT Patent Application No. PCT/JP2022/012462 whose priority is claimed on Japanese Patent Application No. 2021-062224. The content of the PCT Application is incorporated herein by reference.

BACKGROUND ART

For example, PTL 1 discloses a cluster combustor that is an example of a combustor used in a gas turbine.

The cluster combustor has a plurality of fuel nozzle portions that jet a fuel and a plurality of air holes that are coaxially provided with the nozzle portions on a downstream side with respect to the fuel nozzle portions. With the jetting of the fuel, a mixed gas of nearby air and the fuel flows in the air holes and is jetted to the downstream side. At this time, as the mixed gas is ignited, a plurality of small-scale flames are formed at an end portion of each of the air holes on the downstream side.

A portion of each of the air holes on the downstream side is an inclined portion that extends by being inclined with respect to a central axis of the combustor while a portion on an upstream side is a straight pipe portion parallel to the central axis of the combustor. For this reason, a swirling component about the central axis of the combustor is given to the mixed gas supplied from the air holes to the downstream side. Accordingly, the flames can be stably maintained.

CITATION LIST

Patent Literature

[PTL 1] Japanese Unexamined Patent Application Publication No. 2008-111651

SUMMARY OF INVENTION

Technical Problem

However, in the combustor described in PTL 1, the air and the fuel suddenly turn when reaching the inclined portion from the straight pipe portion. For this reason, in a case where the density of the fuel is lower than the density of the air, the fuel is biased to a part of an inner peripheral surface of the inclined portion due to a difference in the specific gravity between the fuel and the air. As a result, the fuel and the air are not sufficiently mixed, and flashback occurs in some cases.

In order to solve the above problems, an object of the present disclosure is to provide a combustor and a gas turbine that can further prevent flashback while improving flame retention properties.

Solution to Problem

According to an aspect of the present disclosure, in order to solve the above problems, there is provided a combustor including a pipe plate that has an upstream side end surface and a downstream side end surface, which are orthogonal to a combustor axis, and in which an air hole penetrating the upstream side end surface and the downstream side end surface is formed; and a fuel jetting portion that jets a fuel to air flowing in the air hole, in which the air hole has a curved flow path that is curved in a direction orthogonal to the combustor axis toward a downstream side, and an inclined flow path that is continuously connected to the downstream side with respect to the curved flow path and that extends by being inclined with respect to the combustor axis to be open to the downstream side end surface, and a fuel jetting position where the fuel jetting portion jets the fuel is positioned on the downstream side with respect to an upstream end of the curved flow path.

According to another aspect of the present disclosure, there is provided a gas turbine including a compressor that compresses air, the combustor that generates a combustion gas by mixing a fuel with air compressed by the compressor and combusting the mixture, and a turbine that is driven by the combustion gas.

Advantageous Effects of Invention

With the combustor and the gas turbine of the present disclosure, flashback can be further prevented while improving flame retention properties.

BRIEF DESCRIPTION OF DRAWINGS

FIG. 5 is an enlarged view of important parts of a combustor according to another modification example. Description of the fuel jetting portion is omitted.

DESCRIPTION OF EMBODIMENTS

First Embodiment

Figure 1:
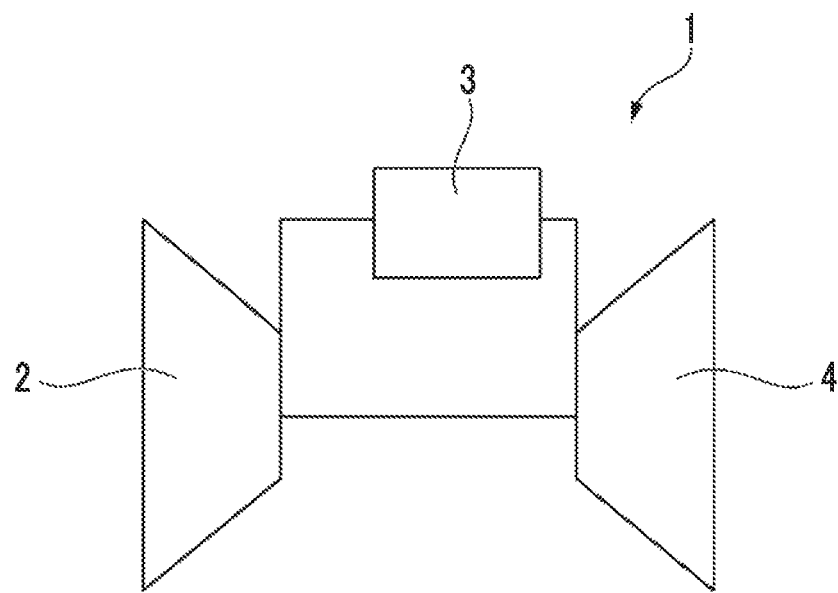
FIG. 1 is a schematic view showing a schematic configuration of a gas turbine according to a first embodiment of the present disclosure.

Hereinafter, a first embodiment of the present invention will be described in detail with reference to FIGS. 1 to 3. As shown in FIG. 1, a gas turbine 1 according to the present embodiment has a compressor 2 that compresses air, a combustor 3 that generates a combustion gas, and a turbine 4 that is driven by the combustion gas.

A plurality of combustors are provided at intervals in a circumferential direction nearby a rotating shaft of the gas turbine 1. The combustor 3 mixes a fuel with the air compressed by the compressor 2 to combust the mixture and generates a high-temperature and high-pressure combustion gas.

[Combustor]

Hereinafter, a configuration of the combustor 3 will be described with reference to FIGS. 2 and 3.

Figure 2:
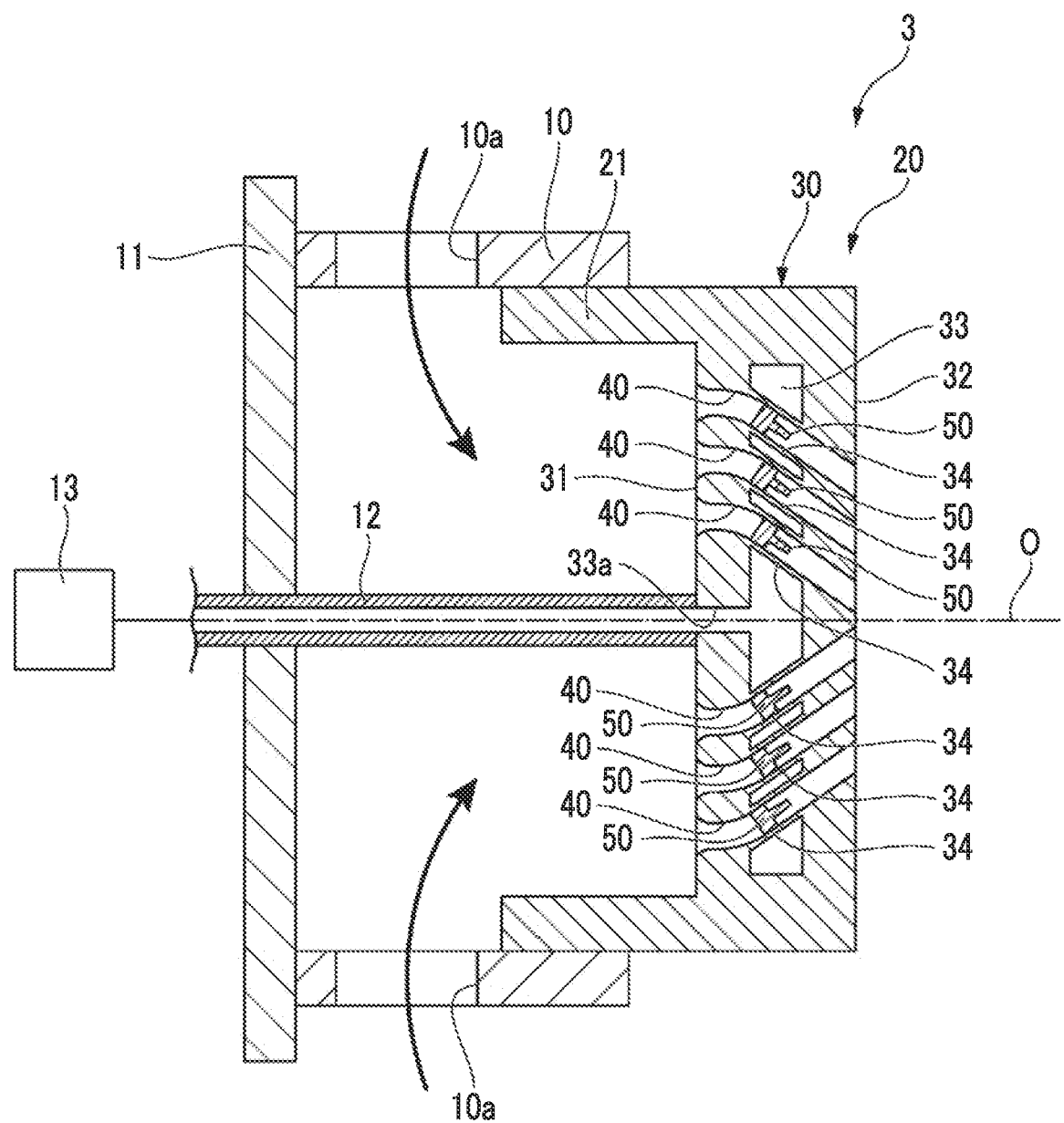
FIG. 2 is a vertical sectional view showing a schematic configuration of a combustor according to the first embodiment of the present disclosure.

As shown in FIG. 2, the combustor 3 includes a tubular body 10, a closing panel 11, a fuel supply pipe 12, a fuel switching unit 13, and a combustor body 20.

[Tubular Body]

The tubular body 10 has a cylindrical shape about a combustor axis O which is a central axis of the combustor 3. A plurality of air introduction holes 10a that penetrate the tubular body 10 inside and outside are formed in the tubular body 10 at an interval in the circumferential direction.

[Closing Panel]

The closing panel 11 has a disk shape that closes an end portion of the tubular body 10 on a rear side (left side in FIG. 1). Air compressed by the compressor 2 is introduced into a space partitioned with the tubular body 10 and the closing panel 11 via the air introduction holes 10a.

[Fuel Supply Pipe]

The fuel supply pipe 12 is a pipe in which a fuel flows. The fuel supply pipe 12 extends along the combustor axis O to penetrate the closing panel 11 in a front-and-rear direction. The fuel flows in the fuel supply pipe 12 from the rear side toward a front side (right side in FIG. 1).

[Fuel Switching Unit]

The fuel switching unit 13 switches between types of fuels to be supplied to the fuel supply pipe 12. The fuel switching unit 13 of the present embodiment is configured to switch a fuel between hydrogen and a natural gas. The fuel switching unit 13 supplies, for example, any one of hydrogen and a natural gas to be supplied from a hydrogen storage tank and a natural gas tank from the rear side to the fuel supply pipe 12.

[Combustor Body]

The combustor body 20 is provided to close the front side of the tubular body 10. The combustor body 20 has an attachment portion 21, a pipe plate 30, and a fuel jetting portion 50.

[Attachment Portion]

The attachment portion 21 has a tubular shape that is about the combustor axis O and has an outer diameter one size smaller than that of the tubular body 10. A part of an outer peripheral surface of the attachment portion 21 on the rear side is fixed over the entire circumference of an inner peripheral surface of the tubular body 10. The attachment portion 21 is provided at a position where the air introduction holes 10a of the tubular body 10 are not closed.

[Pipe Plate]

The pipe plate 30 has a disk shape about the combustor axis O. A rear end of an outer peripheral portion of the pipe plate 30 is integrally fixed to a front end of the attachment portion 21 over the entire circumference. An end surface of the pipe plate 30 facing the rear side is an upstream side end surface 31. A surface of the pipe plate 30 facing the front side is a downstream side end surface 32. The upstream side end surface 31 and the downstream side end surface 32 each have a planar shape orthogonal to the combustor axis O and are parallel to each other.

[Plenum]

The pipe plate 30 has a plenum 33 which is a hollow portion inside. The plenum 33 is a space having a disk shape like the outer shape of the pipe plate 30. A fuel hole 33a extending over an inner surface of the plenum 33 and the upstream side end surface 31 along the combustor axis O is formed in the pipe plate 30. A front end of the fuel supply pipe 12 is connected to the fuel hole 33a. Accordingly, a fuel flowing in the fuel supply pipe 12 is introduced into the plenum 33 via the fuel hole 33a. With the supply of the fuel, the plenum 33 is filled with the fuel.

[Pipe-Shaped Wall Member]

The pipe plate 30 is provided with a plurality of pipe-shaped wall members 34 to extend in the plenum 33 in the front-and-rear direction. The plurality of pipe-shaped wall members 34 are disposed to be spaced apart from each other in a direction orthogonal to the combustor axis O.

[Air Hole]

A plurality of air holes 40 penetrating the upstream side end surface 31 and the downstream side end surface 32 are formed over the upstream side end surface 31 and the downstream side end surface 32 in the pipe plate 30. The air holes 40 pass through the inside of the pipe-shaped wall members 34, respectively. That is, a part of a flow path of each of the air holes 40 is formed by the pipe-shaped wall member 34. The plurality of air holes 40 are disposed to be spaced apart from each other in the direction orthogonal to the combustor axis O in accordance with positions where the pipe-shaped wall members 34 are disposed.

Air flows in the air holes 40 with the rear side as an upstream side and the front side as a downstream side. That is, air introduced into the space partitioned with the tubular body 10 and the closing panel 11 via the air introduction holes 10a flows in the air holes 40 of the pipe plate 30 from the rear side toward the front side.

Figure 3:
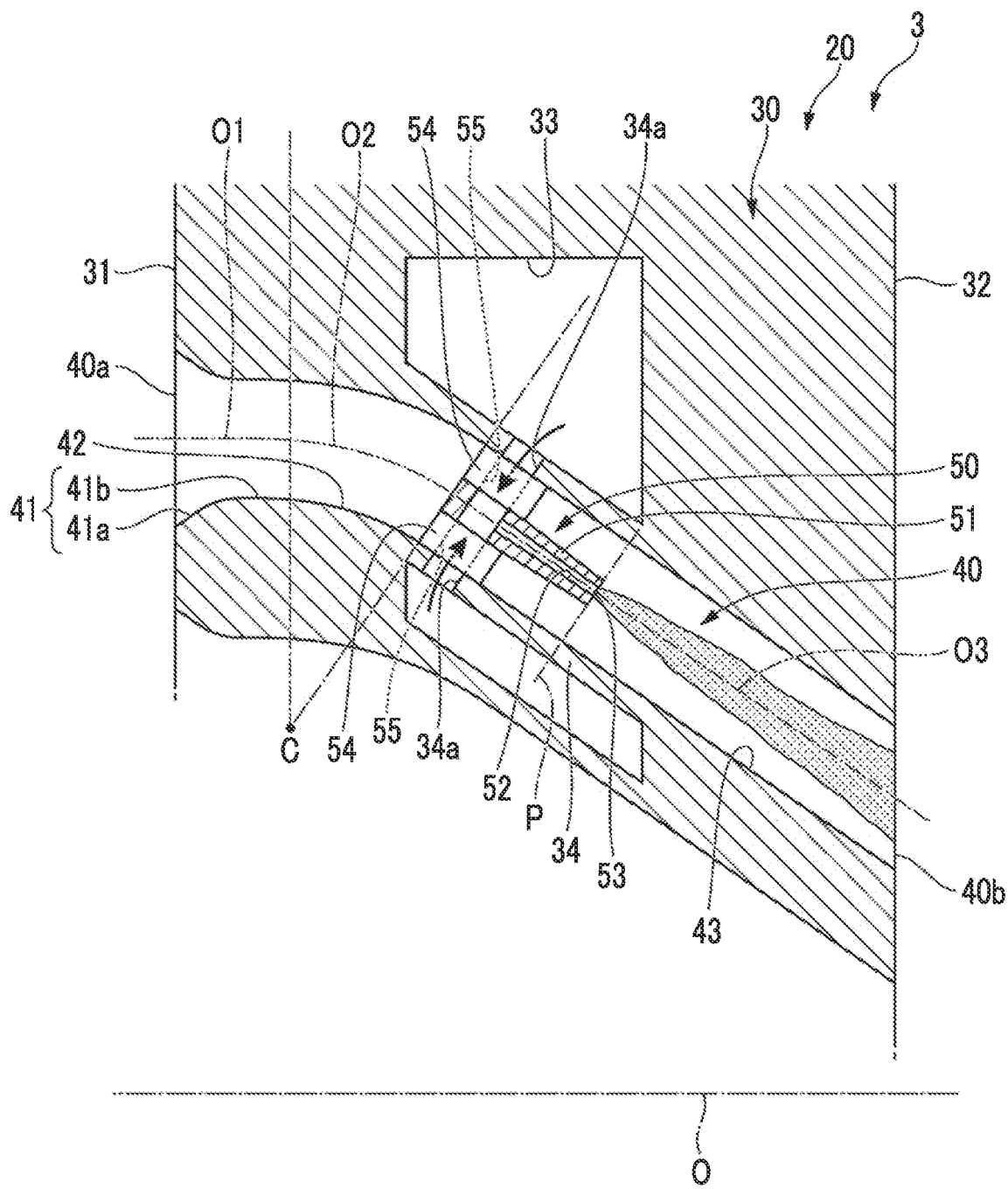
FIG. 3 is an enlarged view of important parts of the combustor according to the first embodiment of the present disclosure.

Specifically, as shown in FIG. 3, the air holes 40 are each configured by connecting an introduction flow path 41, a curved flow path 42, and an inclined flow path 43 sequentially from the upstream side toward the downstream side.

[Introduction Flow Path]

The introduction flow path 41 is a portion of the air hole 40 on the most upstream side. The introduction flow path 41 has a straight pipe portion 41b extending along a first central axis O1 parallel to the combustor axis O. The straight pipe portion 41b extends linearly with a uniform inner diameter in a front-rear direction.

A curved surface portion 41a is formed between an end portion of the straight pipe portion 41b on the upstream side and the upstream side end surface 31. The curved surface portion 41a connects a space between an upstream end of the straight pipe portion 41b and the upstream side end surface 31 with a curved surface. That is, the curved surface portion 41a opens the introduction flow path 41 to the upstream side end surface 31 and forms an upstream-side opening 40a of the air hole 40.

The curved surface portion 41a is a convex surface of which a diameter decreases toward the downstream side. An end portion of the curved surface portion 41a on the downstream side is smoothly continuous to the end portion of the straight pipe portion 41b on the upstream side.

[Curved Flow Path]

The curved flow path 42 is a portion continuous to the downstream side with respect to the introduction flow path 41 and is a portion that becomes an intermediate portion of the air hole 40.

The inner diameter of the curved flow path 42 is the same inner diameter of the straight pipe portion 41b of the introduction flow path 41. The curved flow path 42 is smoothly and continuously connected to an end portion of the straight pipe portion 41b on the downstream side, that is, an end portion of the introduction flow path 41 on the downstream side.

The curved flow path 42 extends to be curved in the direction orthogonal to the combustor axis O toward the downstream side. Accordingly, a second central axis O2 which is a central axis of the curved flow path 42 is also curved in the direction orthogonal to the combustor axis O toward the downstream side. In the present embodiment, the second central axis O2 extends from an end portion of the curved flow path 42 on the upstream side to an end portion on the downstream side with the same curvature radius about a center C of the same circle. That is, the curved flow path 42 extends while uniformly being curved from the upstream side to the downstream side.

[Inclined Flow Path]

The inclined flow path 43 extends to be inclined at a constant inclination angle with respect to the combustor axis O. That is, a third central axis O3 which is a central axis of the inclined flow path 43 is linear in the direction orthogonal to the combustor axis O toward the downstream side. The inner diameter of the inclined flow path 43 is the same as the inner diameter of the curved flow path 42.

An end portion of the inclined flow path 43 on the upstream side is smoothly and continuously connected to the end portion of the curved flow path 42 on the downstream side. Accordingly, the third central axis O3 of the inclined flow path 43 is positioned on a tangent line at an end portion of the second central axis O2 of the curved flow path 42 on the downstream side. An angle of the third central axis O3 of the inclined flow path 43 with respect to the combustor axis O is set to, for example, 10 to 45 degrees, preferably 20 to 40 degrees, and more preferably 25 to 35 degrees. An end portion of the inclined flow path 43 on the downstream side is open to the downstream side end surface 32 of the pipe plate 30. That is, the end portion of the inclined flow path 43 on the downstream side forms a downstream-side opening of the air hole 40. The inclined flow path 43 extends about the combustor axis O when viewed from a direction along the combustor axis O.

[Fuel Jetting Portion]

The fuel jetting portion 50 jets a fuel to air flowing in the air hole 40. The fuel jetting portion 50 of the present embodiment is provided in the air hole 40 and is provided at an inner peripheral surface of the inclined flow path 43 of the air hole 40 in the present embodiment. The fuel jetting portion 50 has a nozzle portion 51 and a plurality of struts 54.

The nozzle portion 51 coaxially extends with the third central axis O3. The nozzle portion 51 has a cylindrical shape that tapers toward the downstream side. The outer shape of the nozzle portion 51 may be a streamlined shape from the upstream side toward the downstream side. An axial flow path 52 that is open to a tip of the nozzle portion 51 on the downstream side and that extends in the nozzle portion 51 along the third central axis O3 is formed in the nozzle portion 51. A rear end, which is an end portion of the nozzle portion 51 on the downstream side, is positioned at a boundary between the curved flow path 42 and the inclined flow path 43.

The struts 54 fix the nozzle portion 51 to the inner peripheral surface of the inclined flow path 43. The struts 54 are provided at a plurality of intervals in a circumferential direction of the third central axis O3. An end portion of the strut 54 on an outer peripheral side is fixed to the inner peripheral surface of the inclined flow path 43. An end portion of the strut 54 on an inner peripheral side is fixed to an outer peripheral surface of the nozzle portion 51. A radial flow path 55 extending in a radial direction of the third central axis O3 is formed inside the strut 54. An end portion of the radial flow path 55 on a radial inner side communicates with the axial flow path 52 in the nozzle portion 51.

It is preferable that the sectional shape of the strut 54 parallel to the third central axis O3 is a streamlined shape or an airfoil shape such that the flow of air flowing in the inclined flow path 43 is not obstructed.

Herein, a communication hole 34a that penetrates the pipe-shaped wall member 34 in a radial direction of a central axis of the air hole 40 is formed in the pipe-shaped wall member 34 of the pipe plate 30. A plurality of communication holes 34a are formed at an interval in the circumferential direction. Each of the communication holes 34a is connected to the radial flow path 55 of the strut 54 and communicates therewith. Accordingly, a fuel placed inside the plenum 33 passes through the radial flow path 55 via the communication hole 34a and flows into the axial flow path 52 in the nozzle portion 51 of the fuel jetting portion 50.

An opening of the axial flow path 52 in the tip of the nozzle portion 51 is a tip jetting hole (fuel jetting hole) 53 for jetting a fuel flowing in the axial flow path 52 to the downstream side. The tip jetting hole 53 is disposed on the central axis of the air hole 40 and in particular, in the present embodiment, is disposed on the third central axis O3, which is the central axis of the inclined flow path 43. Accordingly, the fuel is jetted from the tip jetting hole 53 to the downstream side along the central axis of the air hole 40.

Herein, a position where the fuel jetting portion 50 jets a fuel in a direction along the central axis of the air hole 40 is defined as a fuel jetting position P. The fuel jetting position P of the present embodiment is on the inclined flow path 43 having a linear shape in the air hole 40.

[Operational Effects]

Next, operations and operational effects of the combustor 3 according to the present embodiment will be described. In the air holes 40 in the pipe plate 30 of the combustor 3, compressed air sequentially flows from the rear side toward the front side, that is, from the upstream side toward the downstream side. In this manner, a fuel is jetted to the air flowing in the air holes 40.

A fuel is supplied to the combustor 3 via the fuel switching unit 13. That is, hydrogen or a natural gas is supplied to the fuel supply pipe 12 as the fuel by the fuel switching unit 13. The fuel is introduced into the plenum 33 of the pipe plate 30 via the fuel supply pipe 12. Then, the fuel placed in the plenum 33 is introduced into the fuel jetting portion 50 provided in the air hole 40 via the communication hole 34a formed in each of the pipe-shaped wall members 34. Then, the fuel introduced into the fuel jetting portion 50 is jetted into the air hole 40 via the tip jetting hole 53 positioned in the tip of the nozzle portion 51.

The fuel jetted into the air hole 40 is mixed with air flowing in the air hole 40 from the upstream side to the downstream side. Accordingly, the mixed gas is generated. The mixed gas is jetted from a downstream-side opening 40b of the air hole 40 and is ignited. Accordingly, a flame is formed to correspond to the downstream-side opening 40b of each of the air holes 40.

Herein, in a case where the fuel switching unit 13 has selected a natural gas as a fuel, the natural gas has low flame retention properties, and stable flame retention is difficult in some cases. On the other hand, in the present embodiment, a mixed gas jetted from the air holes 40 is jetted to the downstream side via the inclined flow path 43 of the air hole 40. For this reason, the mixed gas is jetted from the air hole 40 in a state where a swirling component about the combustor axis O is given. Accordingly, a flame generated by the mixed gas can be stably maintained. That is, the flame retention properties of the combustor 3 can be improved.

In addition, by giving a swirling component to a mixed gas as described above, an effect of promoting mixing of air and a fuel can be obtained in addition to the strengthening of flame retention.

Herein, in a case where a highly combustible fuel such as hydrogen is used, there is a possibility of inducing flashback when the mixed gas in the air hole 40 is given the swirling component. For this reason, it is difficult to promote the mixing of air and a fuel by giving the swirling component into the air hole 40.

On the other hand, in the present embodiment, a swirling flow is not formed in the air hole 40, and the swirling flow is configured to be formed after the fuel and the air come out of the air hole 40. That is, since the fuel and the air can be rapidly mixed after coming out of the air hole 40, a risk of flashback can be avoided, and appropriate mixing promotion can be achieved. Accordingly, NOx generated during hydrogen combustion can be reduced. For this reason, the present invention can also be applied to a combustor that only uses hydrogen as a fuel.

In addition, in the present embodiment, the fuel jetting position P for the fuel jetting portion 50 is on the inclined flow path 43. For this reason, a fuel jetted toward the downstream side in the inclined flow path 43 flows together with air in a state where straightness is maintained. Accordingly, the fuel can be prevented from being jetted in a state of being biased to a part of the air hole 40 in a circumferential direction.

In a case where the fuel jetting position P is positioned on the upstream side with respect to the curved flow path 42, that is, in a case where the fuel jetting position P is positioned, for example, in the introduction flow path 41 or on the upstream side with respect to the pipe plate 30, a fuel and air flowing in the air hole 40 each receive a large centrifugal force in the curved flow path 42. For this reason, in particular, in a case where the specific gravity of the fuel and the specific gravity of the air are significantly different from each other, the fuel is biased to a part of the air hole 40 in the circumferential direction according to the centrifugal force. In particular, in a case where hydrogen is supplied by the fuel switching unit 13 as the fuel, the specific gravity of the hydrogen and the specific gravity of the air are significantly different from each other. For this reason, fuel distribution in which the fuel is biased to the inside of a curve of the curved flow path 42 is caused, and a risk of occurrence of flashback increases.

On the other hand, in the present embodiment, air and a fuel do not receive a centrifugal force via the curved flow path 42 due to a configuration where the fuel is jetted on the downstream side with respect to the curved flow path 42 of the air hole 40. For this reason, the fuel reaches the downstream-side opening 40b of the air hole 40 in a state where straightness is maintained. Therefore, the occurrence of flashback can be prevented.

Further, since a nozzle of the fuel jetting portion 50 is configured to jet a fuel to the downstream side along the central axis of the air hole 40, the fuel can be jetted in a state of being most spaced apart from an inner peripheral surface of the air hole 40. Since the fuel jetted as described above flows to the downstream side while maintaining straightness, the fuel can be further prevented from being biased to the inner peripheral surface of the air hole 40.

Second Embodiment

Figure 4:
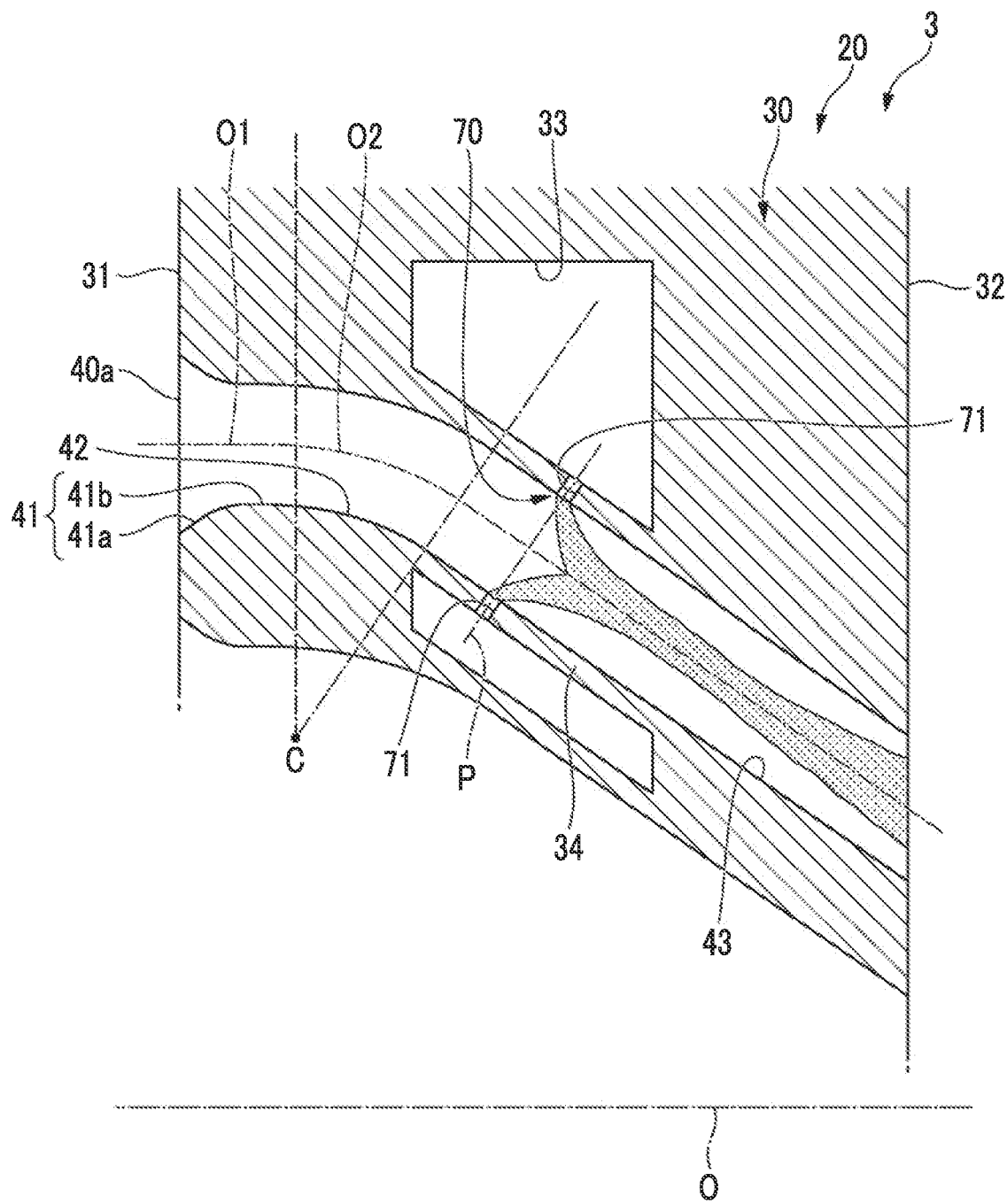
FIG. 4 is an enlarged view of important parts of a combustor according to a second embodiment of the present disclosure.

Next, a second embodiment of the present invention will be described with reference to FIG. 4. In FIG. 4, components that are the as those of the first embodiment will be assigned with the same reference signs, and detailed description thereof will be omitted.

The second embodiment is different from the first embodiment in terms of a configuration of a fuel jetting portion 70. The fuel jetting portion 70 of the second embodiment has a plurality of inner peripheral jetting holes (fuel jetting holes) 71.

The inner peripheral jetting holes 71 penetrate the pipe-shaped wall member 34 in the radial direction to cause the plenum 33 and the air hole 40 to communicate with each other. The inner peripheral jetting holes 71 are configured to directly jet a fuel in the plenum 33 into the air hole 40. The plurality of inner peripheral jetting holes 71 are formed at the same central axis direction positions in the air hole 40 at an interval in the circumferential direction. The central axis direction position is the fuel jetting position P in the second embodiment. The fuel jetting position P of the present embodiment is on the inclined flow path 43 in the air hole 40 as in the first embodiment.

The inner peripheral jetting holes 71 may be formed at circumferential positions facing each other, respectively. That is, with a pair of inner peripheral jetting holes 71 formed at positions facing each other as a set, only a set of inner peripheral jetting holes 71 or a plurality of sets may be formed.

With the above configuration, as fuels jetted from the plurality of fuel jetting holes at the same central axis direction positions interfere with each other, the fuels are likely to flow along the central axis of the air hole 40. In particular, in a case where the fuels are jetted from the positions facing each other, two flows cancel each other's radial components of flow velocities, and a flow along the central axis can be formed. For this reason, as in the first embodiment, the fuels can be prevented from being biased and coming into contact with a part of the inner peripheral surface of the air hole 40.

Other Embodiments

Although the embodiments of the present invention have been described hereinbefore, the present invention is not limited thereto and can undergo some changes as appropriate without departing from the technical concept of the invention.

For example, although the fuel jetting position P is positioned on the inclined flow path 43 in the embodiments, the invention is not limited thereto. The fuel jetting position P may be at the end portion of the inclined flow path 43 on the upstream side or may be at the curved flow path 42. That is, the fuel jetting position P may be on the downstream side with respect to the end portion of the curved flow path 42 on the upstream side.

When the fuel jetting position P is at the straight pipe portion 41b of the introduction flow path 41, a fuel having high straightness in accordance with the shape of the straight pipe portion 41b flows into the curved flow path 42 with momentum. In this case, the curved flow path 42 receives a centrifugal force, and significant bias occurs in the circumferential distribution of the fuel. As described above, when the fuel is jetted in the middle of the curved flow path 42, an effect of the centrifugal force by the curved flow path 42 is prevented, and the bias in the circumferential distribution of the fuel can be prevented.

Figure 5:
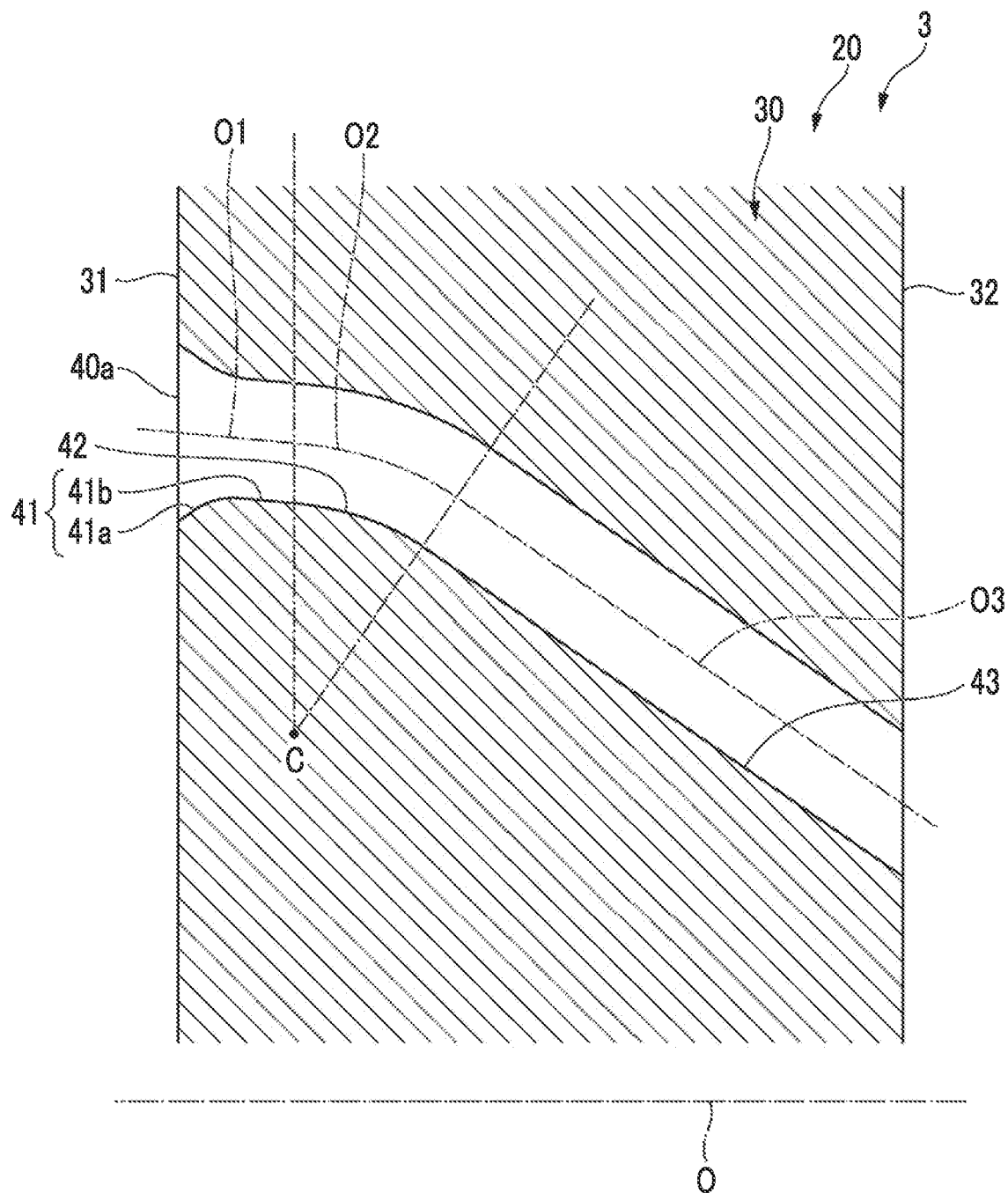
FIG. 5 is an enlarged view of important parts of a combustor according to a modification example. Description of a fuel jetting portion is omitted.

In addition, an example in which the first central axis O1 of the introduction flow path 41 is parallel to the combustor axis O and is perpendicular to the upstream side end surface 31 of the pipe plate 30 has been described in the embodiments. However, the invention is not limited thereto. For example, as in a modification example shown in FIG. 5, the first central axis O1 of the introduction flow path 41 may have a slight inclination angle with respect to the combustor axis O. The inclination angle of the first central axis O1 with respect to the combustor axis O of this case may be smaller than an inclination angle of the third central axis O3 of the inclined flow path 43 with respect to the combustor axis O. Accordingly, the curved flow path 42 about the second central axis O2 that connects the first central axis of to the second central axis O2 can be formed. Therefore, the gist of the present invention in which the fuel jetting position P is specified on the premise of the configuration including the curved flow path 42 and the inclined flow path 43 is not lost.

Figure 6:
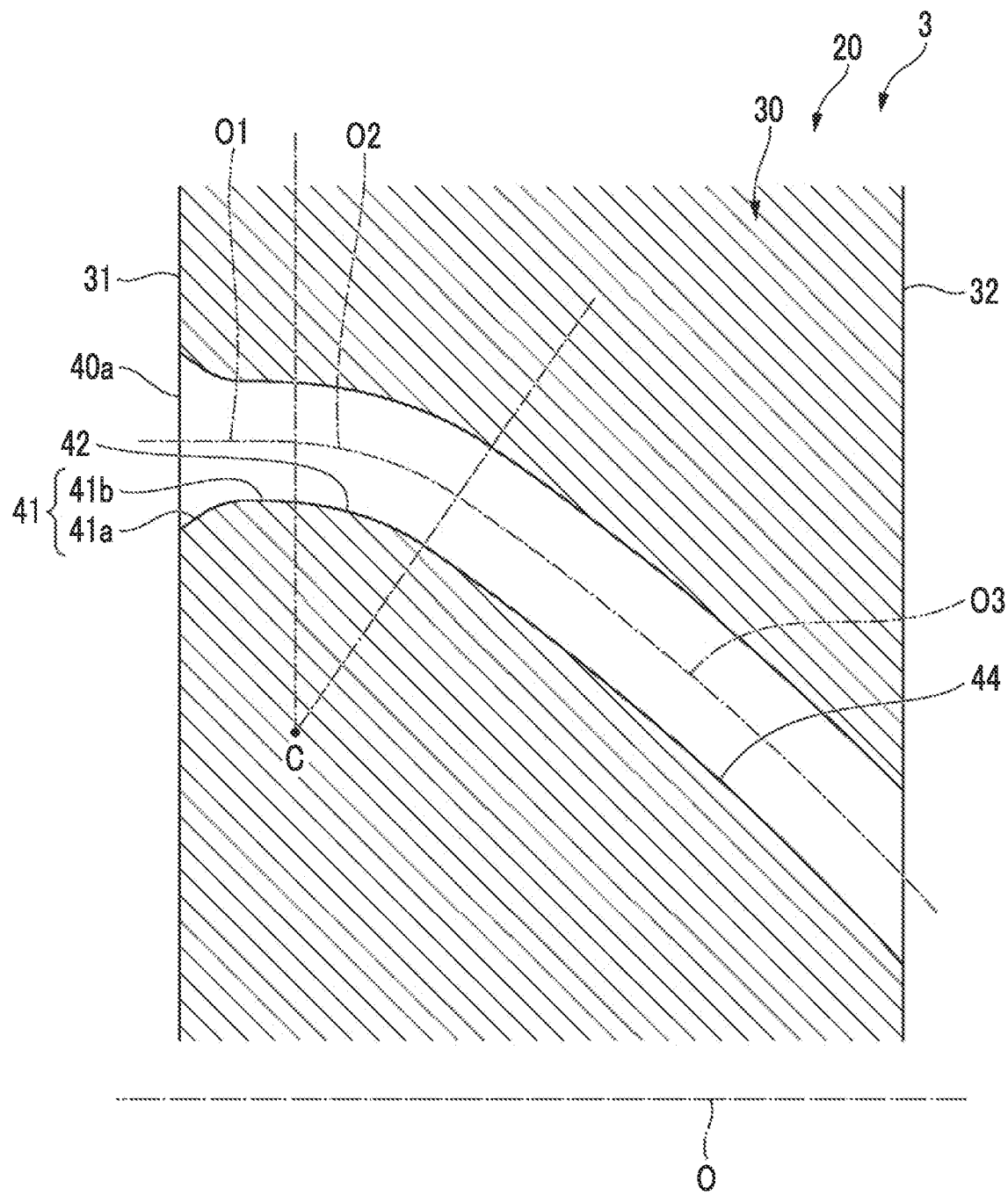

In addition, although an example in which the inclined flow path 43 linearly extends has been described in the embodiments, the invention is not necessarily limited thereto. For example, as in a modification example shown in FIG. 6, an inclined flow path 44 having a gentle curvature may be used instead of the linear inclined flow path 43. The third central axis O3 of the inclined flow path 44 has a curvature radius larger than that of the second central axis O2 about the curved flow path 42. Accordingly, the inclined flow path 44 of the modification example is a curved flow path having a curvature smaller than that of the curved flow path 42. Consequently, the operational effects are also the same as in the embodiments.

APPENDIX

The combustor 3 and the gas turbine 1 described in each embodiment are understood, for example, as follows.

(1) The combustor 3 according to a first aspect includes the pipe plate 30 that has the upstream side end surface 31 and the downstream side end surface 32, which are orthogonal to the combustor axis O, and in which the air holes 40 penetrating the upstream side end surface 31 and the downstream side end surface 32 are formed; and the fuel jetting portions 50 and 70 that jet a fuel to air flowing in the air holes 40, in which the air holes 40 each have the curved flow path 42 that is curved toward the downstream side in the direction orthogonal to the combustor axis O, and the inclined flow path 43 or 44 that is continuously connected to the downstream side with respect to the curved flow path 42 and that extends by being inclined with respect to the combustor axis O to be open to the downstream side end surface 32, and the fuel jetting position P where the fuel jetting portion 50 or 70 jets the fuel is positioned on the downstream side with respect to an upstream end of the curved flow path 42.

With the above configuration, since a swirling flow can be formed by the inclined flow path 43 or 44 on the downstream side with respect to the pipe plate 30, flame retention can be stably performed.

In addition, since a fuel jetting position is positioned on the downstream side with respect to the upstream end of the curved flow path 42, a fuel jetted from the fuel jetting portion 50 or 70 can be prevented from being biased to a part of the inclined flow path 43 in the circumferential direction.

(2) The combustor 3 according to a second aspect may be the combustor 3 according to (1), in which the fuel jetting position P is positioned on the downstream side with respect to an upstream end of the inclined flow path 43 or 44.

Since the fuel jetting position P is at the inclined flow path 43 or 44, a fuel jetted from the fuel jetting portion 50 or 70 flows to the downstream side in a state where straightness is maintained. For this reason, the fuel can be prevented from being biased to a part of the air hole 40.

(3) The combustor 3 according to a third aspect may be the combustor 3 according to (1) or (2), in which the inclined flow path 43 extends to be inclined at a constant inclination angle with respect to the combustor axis O.

(4) The combustor 3 according to a fourth aspect may be the combustor 3 according to (1) or (2), in which the inclined flow path 44 is a curved flow path of which a curvature is smaller than a curvature of the curved flow path 42.

(5) The combustor 3 according to a fifth aspect may be the combustor 3 according to any one of (1) to (4), in which the fuel jetting portion 50 has the nozzle portion 51 that jets the fuel, and the nozzle portion 51 jets the fuel to the downstream side along the central axis of the air hole 40.

Accordingly, since the fuel flows along the central axis of the air hole 40, the fuel is prevented from being biased and coming into contact with a part of the inner peripheral surface of the air hole 40.

(6) The combustor 3 according to a sixth aspect may be the combustor 3 according to any one of (1) to (4), in which the fuel jetting portion 70 has, at the same central axis direction positions in the air hole 40, a plurality of fuel jetting holes disposed in the inner peripheral surface of the air hole 40 at an interval in the circumferential direction.

Examples of the fuel jetting hole include the inner peripheral jetting hole 71.

As fuels jetted from the plurality of fuel jetting holes at the same central axis direction positions interfere with each other, the fuels are likely to flow along the central axis of the air hole 40. For this reason, the fuels can be prevented from being biased and coming into contact with a part of the inner peripheral surface of the air hole 40.

(7) The combustor 3 according to a seventh aspect may be the combustor 3 according to any one of (1) to (6), in which the air hole 40 further has the introduction flow path 41 that is open to the upstream side end surface 31 to linearly extend parallel to the combustor axis O and that has a downstream end continuously connected to the upstream end of the curved flow path 42.

In a case where the introduction flow path 41 is inclined with respect to the combustor axis O, air delamination of the introduction flow path 41 is likely to occur at an opening of the upstream side end surface 31. In the present aspect, the introduction flow path 41 is parallel to the combustor axis O and is orthogonal to the upstream side end surface 31. For this reason, the air delamination at the opening is prevented.

(8) The combustor 3 according to an eighth aspect may be the combustor 3 according to (7), in which the first central axis O1 of the introduction flow path 41 is parallel to the combustor axis O and is perpendicular to the upstream side end surface 31 of the pipe plate 30.

(9) The combustor 3 according to a ninth aspect may be the combustor according to (7), in which the inclination angle of the first central axis O1 of the introduction flow path 41 with respect to the combustor axis O is smaller than the inclination angle of the third central axis O3 of the inclined flow path 43 with respect to the combustor axis O.

(10) The combustor 3 according to a tenth aspect is the combustor 3 according to any one of (1) to (9) that further has the fuel switching unit 13 switching the fuel between hydrogen and a natural gas.

Herein, in a case where the fuel is a natural gas, in addition to other fuels, stable flame retention is difficult in some cases. In the present aspect, since a mixed gas of air and the fuel jetted from the inclined flow path 43 to the downstream side becomes a swirling flow, stable flame retention can be performed even in a case where the fuel is a natural gas.

On the other hand, in a case where the fuel is hydrogen, when an inclination angle of the flow path varies on an inlet side and an outlet side of the air hole 40, hydrogen having low specific gravity is biased to a part of an outlet of the air hole 40 in the circumferential direction, which is not preferable. In the present aspect, since the fuel jetting position P is on the downstream side with respect to the upstream end of the curved flow path 42, even in a case where the fuel is hydrogen, the hydrogen can be prevented from being biased in the air hole 40.

(11) The gas turbine 1 according to an eleventh aspect includes the compressor 2 that compresses air, the combustor 3 according to any one of (1) to (10) that gene combustion gas by mixing a fuel with the air compressed by the compressor 2 and combusting the mixture, and the turbine 4 that is driven by the combustion gas.

With the gas turbine 1, while improving flame retention properties by using the mixed gas of the fuel and the air as a swirling flow, deviation of the fuel in the air hole 40 can be prevented, and thus flashback can be further prevented.

INDUSTRIAL APPLICABILITY

The combustor and the gas turbine that can further prevent flashback while improving flame retention properties can be provided.

REFERENCE SIGNS LIST

1: Gas turbine
2: Compressor
3: Combustor
4: Turbine
10: Tubular body
10a: Air introduction holes
11: Closing panel
12: Fuel supply pipe
13: Fuel switching unit
20: Combustor body
21: Attachment portion
30: Pipe plate
31: Upstream side end surface
32: Downstream side end surface
33: Plenum
33a: Fuel hole
34: Pipe-shaped wall member
34a: Communication hole
40: Air hole
40a: Upstream-side opening
40b: Downstream-side opening
41: Introduction flow path
41a: Curved surface portion
41b: Straight pipe portion
42: Curved flow path
43: Inclined flow path
44: Inclined flow path
50: Fuel jetting portion
51: Nozzle portion
52: Axial flow path
53: Tip jetting hole (fuel jetting hole)
54: Strut
55: Radial flow path
70: Fuel jetting portion
71: Inner peripheral jetting hole (fuel jetting hole)
O: Combustor axis
O1: First central axis
O2: Second central axis
O3: Third central axis
C: Center
P: Fuel jetting position

The invention claimed is:

1. A combustor comprising:
a pipe plate that has an upstream side end surface and a downstream side end surface, the upstream side end surface and the downstream side end surface extending in a direction that is transverse to a combustor axis, and in which an air hole penetrating the upstream side end surface and the downstream side end surface is formed; and
a fuel jetting portion that jets a fuel to air flowing in the air hole,
wherein the air hole has
a curved flow path that is curved toward the combustor axis as the curved flow path extends toward a downstream end of the air hole, and
an inclined flow path that is continuously connected to a downstream end of the curved flow path and that extends by being inclined with respect to the combustor axis to be open to the downstream side end surface, and
wherein a fuel jetting position where the fuel jetting portion jets the fuel is closer to the downstream end of the air hole with respect to an upstream end of the curved flow path.

2. The combustor according to claim 1, wherein the fuel jetting position is closer to the downstream end of the air hole with respect to an upstream end of the inclined flow path.

3. The combustor according to claim 1, wherein the inclined flow path extends to be inclined at a constant inclination angle with respect to the combustor axis.

4. The combustor according to claim 1, wherein the inclined flow path has a curvature which is smaller than a curvature of the curved flow path.

5. The combustor according to claim 1, wherein the fuel jetting portion has a nozzle portion that jets the fuel, and
the nozzle portion has a fuel jetting hole through which the fuel is jetted toward the downstream end of the air hole along a central axis of the air hole.

6. The combustor according to claim 1, wherein the fuel jetting portion has a plurality of fuel jetting holes that are disposed in an inner peripheral surface of the air hole at an interval in a circumferential direction, the plurality of fuel jetting holes being arranged at a same axial position relative to an axis passing through the air hole.

7. The combustor according to claim 1, wherein the air hole further has an introduction flow path that is open to the upstream side end surface to linearly extend parallel to the combustor axis and that has a downstream end continuously connected to the upstream end of the curved flow path.

8. The combustor according to claim 7,
wherein a first central axis of the introduction flow path is parallel to the combustor axis and is perpendicular to the upstream side end surface of the pipe plate.

9. The combustor according to claim 7,
wherein an inclination angle of a first central axis of the introduction flow path with respect to the combustor axis is smaller than an inclination angle of a central axis of the inclined flow path with respect to the combustor axis.

10. The combustor according to claim 1, further comprising:
a fuel switching unit that switches the fuel between hydrogen and a natural gas.

11. A gas turbine comprising:
a compressor that compresses air;
the combustor according to claim 1 that generates a combustion gas by mixing a fuel with air compressed by the compressor to form a mixture and combusting the mixture; and
a turbine that is driven by the combustion gas.

\* \* \* \* \*